US009851767B2

(12) United States Patent
Bielman et al.

(10) Patent No.: US 9,851,767 B2
(45) Date of Patent: *Dec. 26, 2017

(54) RESET SUPERVISOR

(71) Applicant: NIKE, Inc., Beaverton, OR (US)

(72) Inventors: James Bielman, Seattle, WA (US);
Kate Cummings, Seattle, WA (US);
Edward Stephen Lowe, Jr., Seattle, WA (US)

(73) Assignee: NIKE, Inc., Beaverton, OR (US)

( * ) Notice: Subject to any disclaimer, the term of this patent is extended or adjusted under 35 U.S.C. 154(b) by 194 days.

This patent is subject to a terminal disclaimer.

(21) Appl. No.: 14/873,455

(22) Filed: Oct. 2, 2015

(65) Prior Publication Data

US 2016/0026225 A1    Jan. 28, 2016

Related U.S. Application Data

(63) Continuation of application No. 13/743,099, filed on Jan. 16, 2013, now Pat. No. 9,170,872.

(51) Int. Cl.
| | |
|---|---|
| G06F 11/00 | (2006.01) |
| G06F 1/24 | (2006.01) |
| G06F 11/07 | (2006.01) |
| G06F 11/14 | (2006.01) |
| G06F 9/445 | (2006.01) |
| G06F 9/44 | (2006.01) |
| G06F 13/38 | (2006.01) |

(52) U.S. Cl.
CPC .......... *G06F 1/24* (2013.01); *G06F 8/65* (2013.01); *G06F 9/4411* (2013.01); *G06F 11/079* (2013.01); *G06F 11/0724* (2013.01); *G06F 11/0793* (2013.01); *G06F 11/1441* (2013.01); *G06F 13/385* (2013.01)

(58) Field of Classification Search
CPC ............ G06F 11/0724; G06F 11/2736; G06F 11/2242; G06F 11/1441; G06F 11/3013; G06F 11/3058; G06F 11/3024; G06F 11/1141
USPC .............................................. 714/22, 23, 31
See application file for complete search history.

(56) References Cited

U.S. PATENT DOCUMENTS

| | | | |
|---|---|---|---|
| 5,070,450 A | 12/1991 | Holman, Jr. et al. | |
| 5,452,443 A | 9/1995 | Oyamada et al. | |
| 5,563,799 A | 10/1996 | Brehmer et al. | |
| 5,774,649 A | 6/1998 | Goh | |
| 6,513,532 B2 | 2/2003 | Mault et al. | |
| 7,917,812 B2 | 3/2011 | Ginggen et al. | |
| 8,040,092 B2 | 10/2011 | Peterson | |
| 9,170,872 B2 * | 10/2015 | Bielman | G06F 11/079 |
| 2009/0251008 A1 | 10/2009 | Sugaya | |
| 2013/0185547 A1 | 7/2013 | Sturdivant et al. | |

FOREIGN PATENT DOCUMENTS

EP    2257135    4/2010

* cited by examiner

*Primary Examiner* — Philip Guyton
(74) *Attorney, Agent, or Firm* — Banner & Witcoff, Ltd.

(57) ABSTRACT

Multiple processor systems are provided. A first processor is configured to monitor the state of at least one other processor by comparing received signals. When the first processor determines that another processor needs to be reset, the first processor provides a reset signal to a reset pin of the processor that needs to be reset. The first processor may reset itself after providing the reset signal.

20 Claims, 10 Drawing Sheets

RESET SUPERVISOR

CROSS-REFERENCE TO RELATED APPLICATION

This application is a continuation of U.S. patent application Ser. No. 13/743,099 filed on Jan. 16, 2013 and entitled "Reset Supervisor" which is incorporated by reference herein in its entirety.

TECHNICAL FIELD

Aspects of the invention relate generally to multiple processor systems. More particularly, aspects relate to mechanisms for monitoring and resetting processors.

BACKGROUND

While most people appreciate the importance of physical fitness, many have difficulty finding the motivation required to maintain a regular exercise program. Some people find it particularly difficult to maintain an exercise regimen that involves continuously repetitive motions, such as running, walking and bicycling. Electronic devices are increasingly being used to motivate, monitor and track athletic activity. Devices have been used to monitor steps, heart rate and other parameters. Some devices are designed to provide data to mobile phones. As electronic devices have been developed to process more data associated with athletic activity the devices have used more powerful processors and/or multiple processors.

Processors periodically need to be reset when errors occur. A hard reset may include executing a routine that a processor performs when power is initially applied to the processor. A soft reset may include executing an abbreviated reset routine. Soft resets are sometimes preferred because some data may be maintained in memory. The type of reset desired may be a function of the type of error encountered.

It has been common for electronic devices to include a dedicated reset circuit to monitor processors and initiate resets when needed. Dedicated reset circuits can add to space requirements and costs.

Therefore, there is a need in the art for improved systems and method for monitoring and resetting processors.

BRIEF SUMMARY

The following presents a simplified summary in order to provide a basic understanding of some aspects of the invention. The summary is not an extensive overview of the invention. The following summary merely presents some concepts of the invention in a simplified form as a prelude to the description below.

Aspects of the invention relate to multiple processor systems. A first processor is configured to monitor the state of at least one other processor when the processors receive at least one signal from a USB connector, wireless receiver, a power receiver or some other source. When the first processor determines that another processor needs to be reset, the first processor provides a reset signal to a reset pin of the processor that needs to be reset. The first processor may reset itself after providing the reset signal.

In some embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIGS. 1A-B illustrate an example of a system for providing personal training in accordance with example embodiments, wherein FIG. 1A illustrates an example network configured to monitor athletic activity, and FIG. 1B illustrates an example computing device in accordance with example embodiments.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure. Further, headings within this disclosure should not be considered as limiting aspects of the disclosure. Those skilled in the art with the benefit of this disclosure will appreciate that the example embodiments are not limited to the example headings.

I. Example Personal Training System

A. Illustrative Computing Devices

Figure 1A:
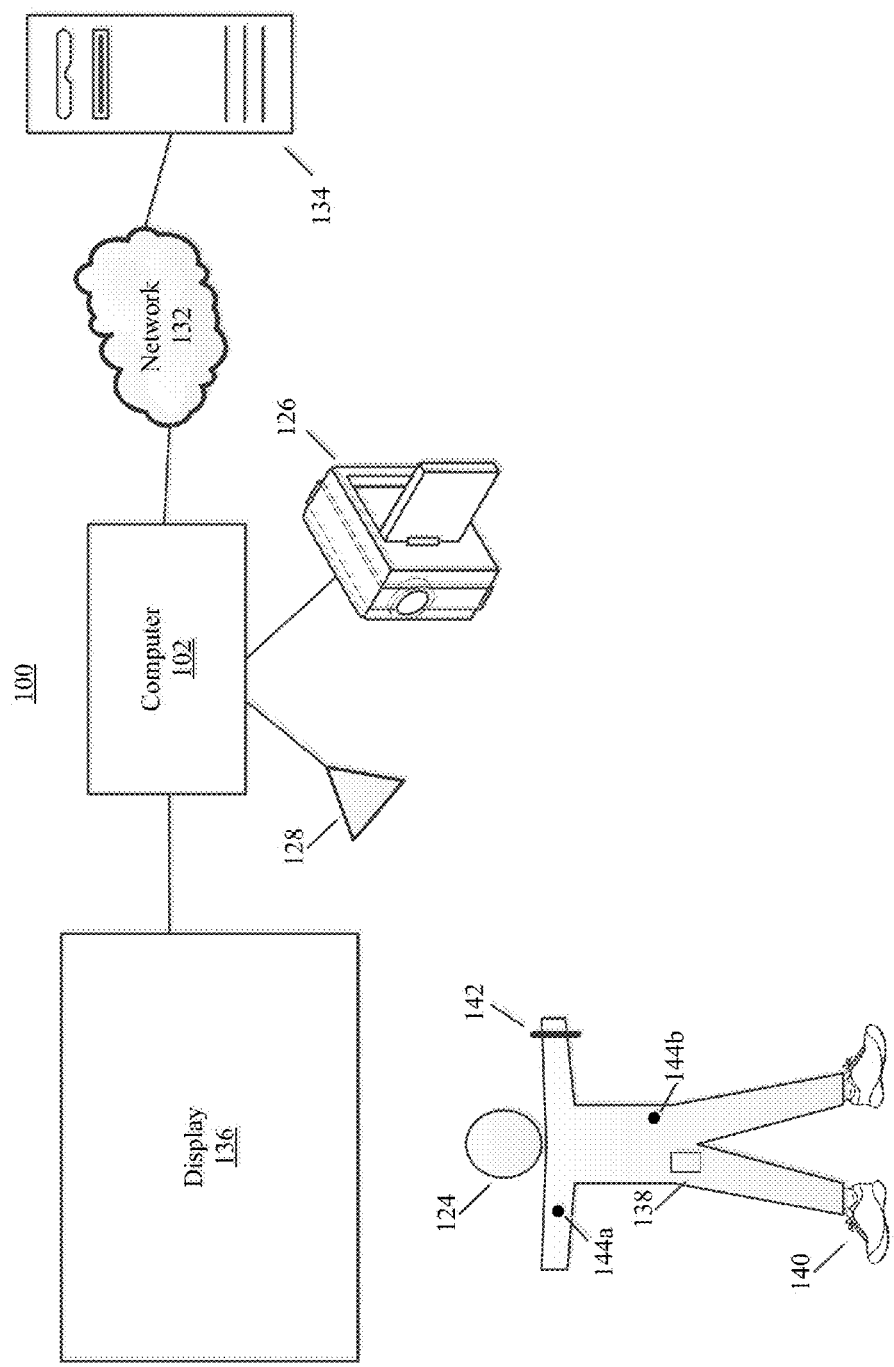

FIG. 1A illustrates an example of a personal training system 100 in accordance with example embodiments. Example system 100 may include one or more electronic devices, such as computer 102. Computer 102 may comprise a mobile terminal, such as a telephone, music player, tablet, netbook or any portable device. In other embodiments, computer 102 may comprise a set-top box (STB), desktop computer, digital video recorder(s) (DVR), computer server(s), and/or any other desired computing device. In certain configurations, computer 102 may comprise a gaming console, such as for example, a Microsoft® XBOX, Sony® Playstation, and/or a Nintendo® Wii gaming consoles. Those skilled in the art will appreciate that these are merely example consoles for descriptive purposes and this disclosure is not limited to any console or device.

Figure 1B:
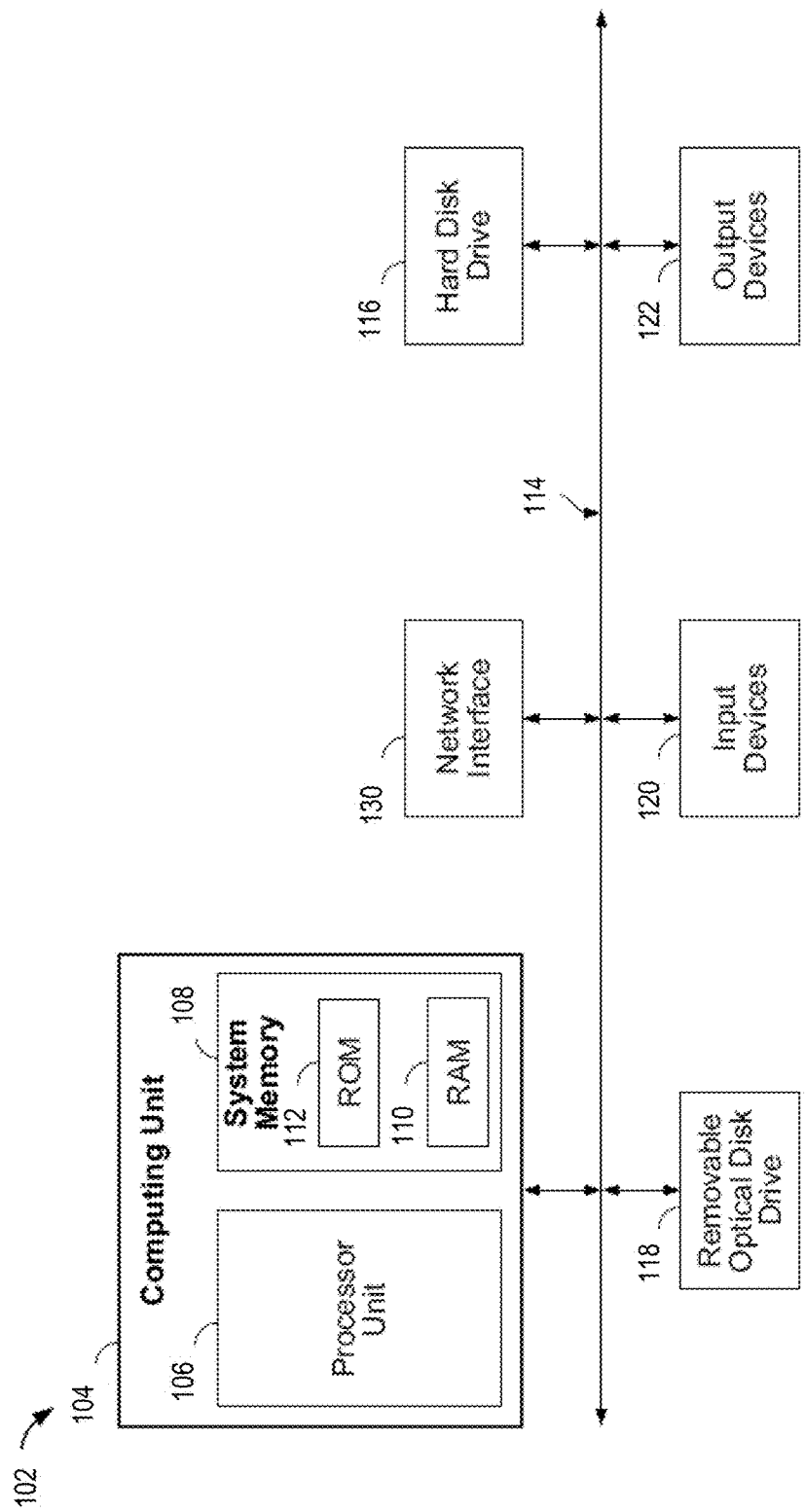

Turning briefly to FIG. 1B, computer 102 may include computing unit 104, which may comprise at least one processing unit 106. Processing unit 106 may be any type of processing device for executing software instructions, such as for example, a microprocessor device. Computer 102 may include a variety of non-transitory computer readable media, such as memory 108. Memory 108 may include, but is not limited to, random access memory (RAM) such as RAM 110, and/or read only memory (ROM), such as ROM 112. Memory 108 may include any of: electronically erasable programmable read only memory (EEPROM), flash memory or other memory technology, CD-ROM, digital versatile disks (DVD) or other optical disk storage, magnetic storage devices, or any other medium that can be used to store the desired information and that can be accessed by computer 102.

The processing unit 106 and the system memory 108 may be connected, either directly or indirectly, through a bus 114 or alternate communication structure to one or more peripheral devices. For example, the processing unit 106 or the system memory 108 may be directly or indirectly connected to additional memory storage, such as a hard disk drive 116, a removable magnetic disk drive, an optical disk drive 118, and a flash memory card. The processing unit 106 and the system memory 108 also may be directly or indirectly connected to one or more input devices 120 and one or more output devices 122. The output devices 122 may include, for example, a display device 136, television, printer, stereo, or speakers. In some embodiments one or more display devices may be incorporated into eyewear. The display devices incorporated into eyewear may provide feedback to users. Eyewear incorporating one or more display devices also provides for a portable display system. The input devices 120 may include, for example, a keyboard, touch screen, a remote control pad, a pointing device (such as a mouse, touchpad, stylus, trackball, or joystick), a scanner, a camera or a microphone. In this regard, input devices 120 may comprise one or more sensors configured to sense, detect, and/or measure athletic movement from a user, such as user 124, shown in FIG. 1A.

Looking again to FIG. 1A, image-capturing device 126 and/or sensor 128 may be utilized in detecting and/or measuring athletic movements of user 124. In one embodiment, data obtained from image-capturing device 126 or sensor 128 may directly detect athletic movements, such that the data obtained from image-capturing device 126 or sensor 128 is directly correlated to a motion parameter. Yet, in other embodiments, data from image-capturing device 126 and/or sensor 128 may be utilized in combination, either with each other or with other sensors to detect and/or measure movements. Thus, certain measurements may be determined from combining data obtained from two or more devices. Image-capturing device 126 and/or sensor 128 may include or be operatively connected to one or more sensors, including but not limited to: an accelerometer, a gyroscope, a location-determining device (e.g., GPS), light sensor, temperature sensor (including ambient temperature and/or body temperature), heart rate monitor, image-capturing sensor, moisture sensor and/or combinations thereof. Example uses of illustrative sensors 126, 128 are provided below in Section I.C, entitled "Illustrative Sensors." Computer 102 may also use touch screens or image capturing device to determine where a user is pointing to make selections from a graphical user interface. One or more embodiments may utilize one or more wired and/or wireless technologies, alone or in combination, wherein examples of wireless technologies include Bluetooth® technologies, Bluetooth® low energy technologies, and/or ANT technologies.

B. Illustrative Network

Computer 102, computing unit 104, and/or any other electronic devices may be directly or indirectly connected to one or more network interfaces, such as example interface 130 (shown in FIG. 1B) for communicating with a network, such as network 132. In the example of FIG. 1B, network interface 130, may comprise a network adapter or network interface card (NIC) configured to translate data and control signals from the computing unit 104 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 130 may employ any suitable connection agent for connecting to a network, including, for example, a wireless transceiver, a power line adapter, a modem, or an Ethernet connection. Network 132, however, may be any one or more information distribution network(s), of any type(s) or topology(s), alone or in combination(s), such as internet(s), intranet(s), cloud(s), LAN(s). Network 132 may be any one or more of cable, fiber, satellite, telephone, cellular, wireless, etc. Networks are well known in the art, and thus will not be discussed here in more detail. Network 132 may be variously configured such as having one or more wired or wireless communication channels to connect one or more locations (e.g., schools, businesses, homes, consumer dwellings, network resources, etc.), to one or more remote servers 134, or to other computers, such as similar or identical to computer 102. Indeed, system 100 may include more than one instance of each component (e.g., more than one computer 102, more than one display 136, etc.).

Regardless of whether computer 102 or other electronic device within network 132 is portable or at a fixed location, it should be appreciated that, in addition to the input, output and storage peripheral devices specifically listed above, the computing device may be connected, such as either directly, or through network 132 to a variety of other peripheral devices, including some that may perform input, output and storage functions, or some combination thereof. In certain embodiments, a single device may integrate one or more components shown in FIG. 1A. For example, a single device may include computer 102, image-capturing device 126, sensor 128, display 136 and/or additional components. In one embodiment, sensor device 138 may comprise a mobile terminal having a display 136, image-capturing device 126, and one or more sensors 128. Yet, in another embodiment, image-capturing device 126, and/or sensor 128 may be peripherals configured to be operatively connected to a media device, including for example, a gaming or media system. Thus, it goes from the foregoing that this disclosure is not limited to stationary systems and methods. Rather, certain embodiments may be carried out by a user 124 in almost any location.

C. Illustrative Sensors

Computer 102 and/or other devices may comprise one or more sensors 126, 128 configured to detect and/or monitor at least one fitness parameter of a user 124. Sensors 126 and/or 128 may include, but are not limited to: an accelerometer, a gyroscope, a location-determining device (e.g., GPS), light sensor, temperature sensor (including ambient temperature and/or body temperature), sleep pattern sensors, heart rate monitor, image-capturing sensor, moisture sensor and/or combinations thereof. Network 132 and/or computer 102 may be in communication with one or more electronic devices of system 100, including for example, display 136, an image capturing device 126 (e.g., one or more video cameras), and sensor 128, which may be an infrared (IR) device. In one embodiment sensor 128 may comprise an IR transceiver. For example, sensors 126, and/or 128 may transmit waveforms into the environment, including towards the direction of user 124 and receive a "reflection" or otherwise detect alterations of those released waveforms. In yet another embodiment, image-capturing device 126 and/or sensor 128 may be configured to transmit and/or receive other wireless signals, such as radar, sonar, and/or audible information. Those skilled in the art will readily appreciate that signals corresponding to a multitude of different data spectrums may be utilized in accordance with various embodiments. In this regard, sensors 126 and/or 128 may detect waveforms emitted from external sources (e.g., not system 100). For example, sensors 126 and/or 128 may detect heat being emitted from user 124 and/or the surrounding environment. Thus, image-capturing device 126 and/or sensor 128 may comprise one or more thermal imaging devices. In one embodiment, image-capturing device 126 and/or sensor 128 may comprise an IR device configured to perform range phenomenology. As a non-limited example, image-capturing devices configured to perform range phenomenology are commercially available from Flir Systems, Inc. of Portland, Oreg. Although image capturing device 126 and sensor 128 and display 136 are shown in direct (wirelessly or wired) communication with computer 102, those skilled in the art will appreciate that any may directly communicate (wirelessly or wired) with network 132.

1. Multi-Purpose Electronic Devices

User 124 may possess, carry, and/or wear any number of electronic devices, including sensory devices 138, 140, 142, and/or 144. In certain embodiments, one or more devices 138, 140, 142, 144 may not be specially manufactured for fitness or athletic purposes. Indeed, aspects of this disclosure relate to utilizing data from a plurality of devices, some of which are not fitness devices, to collect, detect, and/or measure athletic data. In one embodiment, device 138 may comprise a portable electronic device, such as a telephone or digital music player, including an IPOD®, IPAD®, or iPhone®, brand devices available from Apple, Inc. of Cupertino, Calif. or Zune® or Microsoft® Windows devices available from Microsoft of Redmond, Wash. As known in the art, digital media players can serve as both an output device for a computer (e.g., outputting music from a sound file or pictures from an image file) and a storage device. In one embodiment, device 138 may be computer 102, yet in other embodiments, computer 102 may be entirely distinct from device 138. Regardless of whether device 138 is configured to provide certain output, it may serve as an input device for receiving sensory information. Devices 138, 140, 142, and/or 144 may include one or more sensors, including but not limited to: an accelerometer, a gyroscope, a location-determining device (e.g., GPS), light sensor, temperature sensor (including ambient temperature and/or body temperature), heart rate monitor, image-capturing sensor, moisture sensor and/or combinations thereof. In certain embodiments, sensors may be passive, such as reflective materials that may be detected by image-capturing device 126 and/or sensor 128 (among others). In certain embodiments, sensors 144 may be integrated into apparel, such as athletic clothing. For instance, the user 124 may wear one or more on-body sensors 144a-b. Sensors 144 may be incorporated into the clothing of user 124 and/or placed at any desired location of the body of user 124. Sensors 144 may communicate (e.g., wirelessly) with computer 102, sensors 128, 138, 140, and 142, and/or camera 126. Examples of interactive gaming apparel are described in U.S. patent application Ser. No. 10/286,396, filed Oct. 30, 2002, and published as U.S. Pat. Pub, No. 2004/0087366, the contents of which are incorporated herein by reference in its entirety for any and all non-limiting purposes. In certain embodiments, passive sensing surfaces may reflect waveforms, such as infrared light, emitted by image-capturing device 126 and/or sensor 128. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

Devices 138-144 may communicate with each other, either directly or through a network, such as network 132. Communication between one or more of devices 138-144 may take place via computer 102. For example, two or more of devices 138-144 may be peripherals operatively connected to bus 114 of computer 102. In yet another embodiment, a first device, such as device 138 may communicate with a first computer, such as computer 102 as well as another device, such as device 142, however, device 142 may not be configured to connect to computer 102 but may communicate with device 138. Those skilled in the art will appreciate that other configurations are possible.

Some implementations of the example embodiments may alternately or additionally employ computing devices that are intended to be capable of a wide variety of functions, such as a desktop or laptop personal computer. These computing devices may have any combination of peripheral devices or additional components as desired. Also, the components shown in FIG. 1B may be included in the server 134, other computers, apparatuses, etc.

2. Illustrative Apparel/Accessory Sensors

In certain embodiments, sensory devices 138, 140, 142 and/or 144 may be formed within or otherwise associated with user's 124 clothing or accessories, including a watch, armband, wristband, necklace, shirt, shoe, or the like. Examples of shoe-mounted and wrist-worn devices (devices 140 and 142, respectively) are described immediately below, however, these are merely example embodiments and this disclosure should not be limited to such.

i. Shoe-Mounted Device

In certain embodiments, sensory device 140 may comprise footwear which may include one or more sensors, including but not limited to: an accelerometer, location-sensing components, such as GPS, and/or a force sensor system. FIG. 2A illustrates one example embodiment of a sensor system 202. In certain embodiments, system 202 may include a sensor assembly 204. Assembly 204 may comprise one or more sensors, such as for example, an accelerometer, location-determining components, and/or force sensors. In the illustrated embodiment, assembly 204 incorporates a plurality of sensors, which may include force-sensitive resistor (FSR) sensors 206. In yet other embodiments, other sensor(s) may be utilized. Port 208 may be positioned within a sole structure 209 of a shoe. Port 208 may optionally be provided to be in communication with an electronic module 210 (which may be in a housing 211) and a plurality of leads 212 connecting the FSR sensors 206 to the port 208. Module 210 may be contained within a well or cavity in a sole structure of a shoe. The port 208 and the module 210 include complementary interfaces 214, 216 for connection and communication.

In certain embodiments, at least one force-sensitive resistor 206 shown in FIG. 2A may contain first and second electrodes or electrical contacts 218, 220 and a force-sensitive resistive material 222 disposed between the electrodes 218, 220 to electrically connect the electrodes 218, 220 together. When pressure is applied to the force-sensitive material 222, the resistivity and/or conductivity of the force-sensitive material 222 changes, which changes the electrical potential between the electrodes 218, 220. The change in resistance can be detected by the sensor system 202 to detect the force applied on the sensor 216. The force-sensitive resistive material 222 may change its resistance under pressure in a variety of ways. For example, the force-sensitive material 222 may have an internal resistance that decreases when the material is compressed, similar to the quantum tunneling composites described in greater detail below. Further compression of this material may further decrease the resistance, allowing quantitative measurements, as well as binary (on/off) measurements. In some circumstances, this type of force-sensitive resistive behavior may be described as "volume-based resistance," and materials exhibiting this behavior may be referred to as "smart materials." As another example, the material 222 may change the resistance by changing the degree of surface-to-surface contact. This can be achieved in several ways, such as by using microprojections on the surface that raise the surface resistance in an uncompressed condition, where the surface resistance decreases when the microprojections are compressed, or by using a flexible electrode that can be deformed to create increased surface-to-surface contact with another electrode. This surface resistance may be the resistance between the material 222 and the electrode 218, 220 222 and/or the surface resistance between a conducting layer (e.g., carbon/graphite) and a force-sensitive layer (e.g., a semiconductor) of a multi-layer material 222. The greater the compression, the greater the surface-to-surface contact, resulting in lower resistance and enabling quantitative measurement. In some circumstances, this type of force-sensitive resistive behavior may be described as "contact-based resistance." It is understood that the force-sensitive resistive material 222, as defined herein, may be or include a doped or non-doped semiconducting material.

The electrodes 218, 220 of the FSR sensor 216 can be formed of any conductive material, including metals, carbon/graphite fibers or composites, other conductive composites, conductive polymers or polymers containing a conductive material, conductive ceramics, doped semiconductors, or any other conductive material. The leads 212 can be connected to the electrodes 218, 220 by any suitable method, including welding, soldering, brazing, adhesively joining, fasteners, or any other integral or non-integral joining method. Alternately, the electrode 218, 220 and associated lead 212 may be formed of a single piece of the same material.

ii. Wrist-Worn Device

Figure 2B:
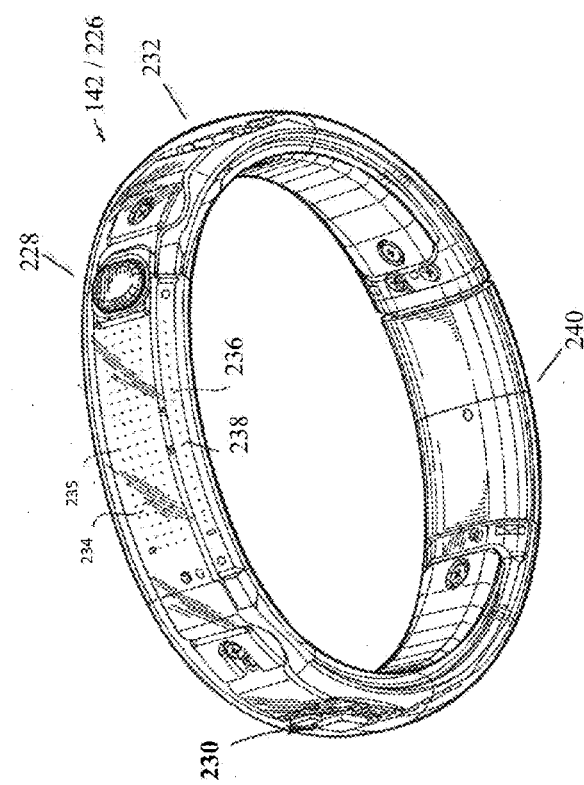
FIGS. 2A-B illustrate example sensor assemblies that may be worn by a user in accordance with example embodiments.
Figure 2A:
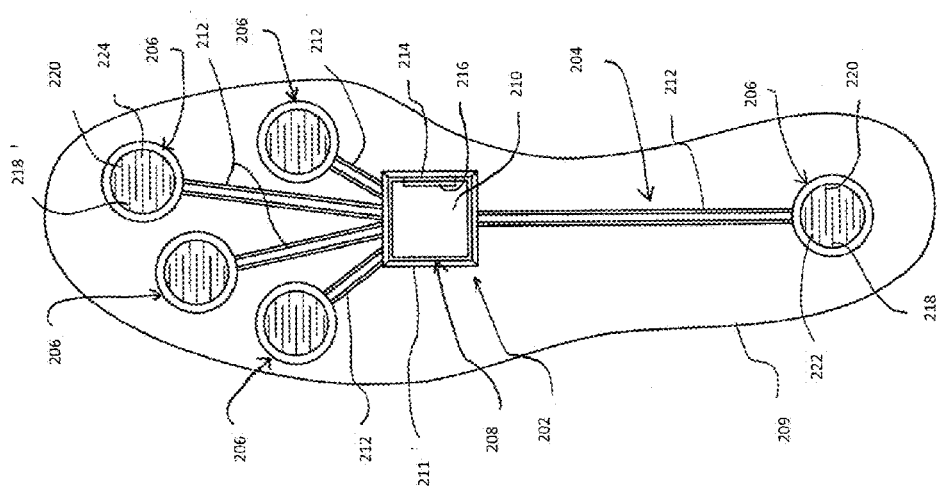

As shown in FIG. 2B, device 226 (which may resemble or be sensory device 142 shown in FIG. 1A) may be configured to be worn by user 124, such as around a wrist, arm, ankle or the like. Device 226 may monitor athletic movements of a user, including all-day activity of user 124. In this regard, device assembly 226 may detect athletic movement during user's 124 interactions with computer 102 and/or operate independently of computer 102. For example, in one embodiment, device 226 may be an all-day activity monitor that measures activity regardless of the user's proximity or interactions with computer 102. Device 226 may communicate directly with network 132 and/or other devices, such as devices 138 and/or 140. In other embodiments, athletic data obtained from device 226 may be utilized in determinations conducted by computer 102, such as determinations relating to which exercise programs are presented to user 124. In one embodiment, device 226 may also wirelessly interact with a mobile device, such as device 138 associated with user 124 or a remote website such as a site dedicated to fitness or health related subject matter. At some predetermined time, the user may wish to transfer data from the device 226 to another location.

As shown in FIG. 2B, device 226 may include an input mechanism, such as a depressible input button 228 assist in operation of the device 226. The input button 228 may be operably connected to a controller 230 and/or any other electronic components, such as one or more of the elements discussed in relation to computer 102 shown in FIG. 1B. Controller 230 may be embedded or otherwise part of housing 232. Housing 232 may be formed of one or more materials, including elastomeric components and comprise one or more displays, such as display 234. The display may be considered an illuminable portion of the device 226. The display 234 may include a series of individual lighting elements or light members such as LED lights 234 in an exemplary embodiment. The LED lights may be formed in an array and operably connected to the controller 230. Device 226 may include an indicator system 236, which may also be considered a portion or component of the overall display 234. It is understood that the indicator system 236 can operate and illuminate in conjunction with the display 234 (which may have pixel member 235) or completely separate from the display 234. The indicator system 236 may also include a plurality of additional lighting elements or light members 238, which may also take the form of LED lights in an exemplary embodiment. In certain embodiments, indicator system may provide a visual indication of goals, such as by illuminating a portion of lighting members 238 to represent accomplishment towards one or more goals.

A fastening mechanism 240 can be unlatched wherein the device 226 can be positioned around a wrist of the user 124 and the fastening mechanism 240 can be subsequently placed in a latched position. The user can wear the device 226 at all times if desired. In one embodiment, fastening mechanism 240 may comprise an interface, including but not limited to a USB port, for operative interaction with computer 102 and/or devices 138, 140.

In certain embodiments, device 226 may comprise a sensor assembly (not shown in FIG. 2B). The sensor assembly may comprise a plurality of different sensors. In an example embodiment, the sensor assembly may comprise or permit operative connection to an accelerometer (including in the form of a multi-axis accelerometer), heart rate sensor, location-determining sensor, such as a GPS sensor, and/or other sensors. Detected movements or parameters from device's 142 sensor(s), may include (or be used to form) a variety of different parameters, metrics or physiological characteristics including but not limited to speed, distance, steps taken, and energy expenditure such as calories, heart rate, sweat detection, effort, oxygen consumed, and/or oxygen kinetics. Such parameters may also be expressed in terms of activity points or currency earned by the user based on the activity of the user.

II. Processor Configurations

Figure 3:
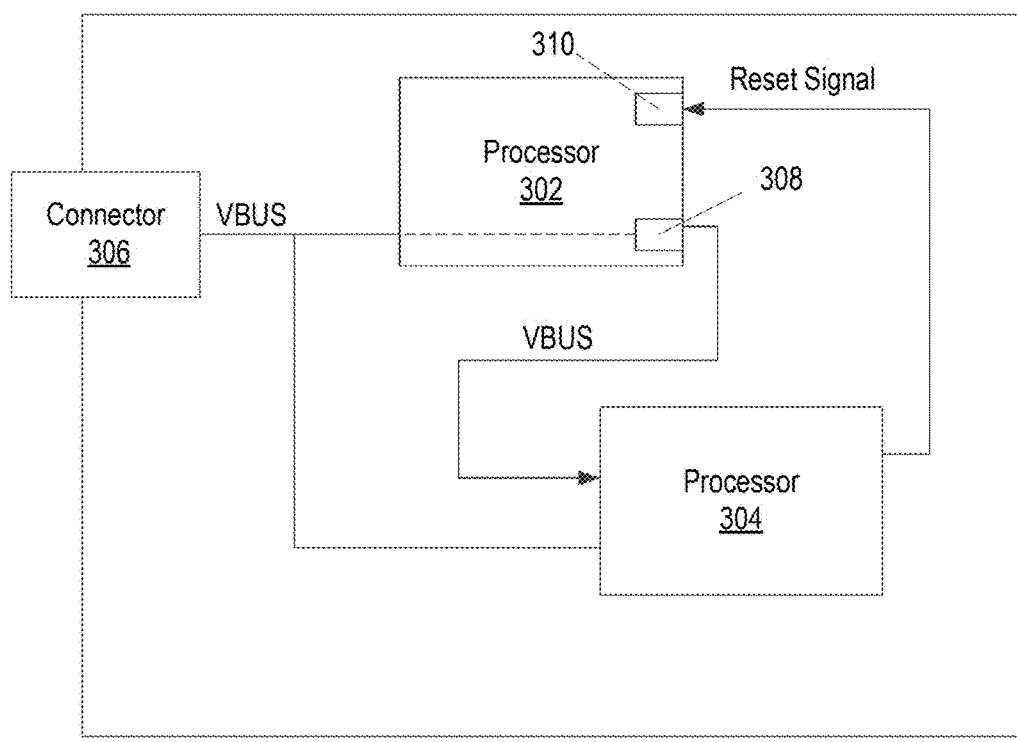
FIG. 3 illustrates a method for calculating energy expenditure, in accordance with an embodiment of the invention.

FIG. 3 illustrates a processor configuration that facilitates one processor resetting another processor in accordance with an embodiment of the invention. The configuration shown in FIG. 3 may be used in a device that is used to measure activity, such as device 226 shown in FIG. 2B. Processors 302 and 304 are each connected to a connector 306. Connector 306 may be implemented with a USB connector or other type of connector that allows a device to electrically connect to another device. In one embodiment, a signal, such as a USB VBUS signal is applied to processor 302 and processor 304. Processor 302 transmits the signal to an output port 308. Output port 308 is connected to an input of processor 304.

Processor 304 may determine if processor 302 needs to be reset by comparing the signal received from connector 306 to the signal received from output port 308. If processor 302 does not need to be reset, processor 302 should receive the signal from connector 306 and transmit the same signal to output port 308. In one embodiment, the signal that leaves connector 306 is a signal with a predetermined voltage level, such as 5 volts. Processor 304 may be programmed to determine if the signal leaving output port 308 is also a signal with a voltage level of 5 volts. If, for example, the voltage level of the signal leaving output port is at 0 volts, processor 304 may determine that there is an error with processor 302. Processor 304 may be programmed to compare signals when processor 304 receives a signal from connector 306. In one embodiment connector 306 provides signals to processors 302 and 304 when connector 306 is connected to another device, such as a USB port of a computer device.

When processor 304 determines that processor 302 needs to be reset, processor 304 may transmit a reset signal to a reset pin 310. Processor 302 may then perform a hard reset or a soft reset when the reset signal is received. In one embodiment, processor 304 may be configured to reset after transmitting a reset signal to reset pin 310.

Figure 4:
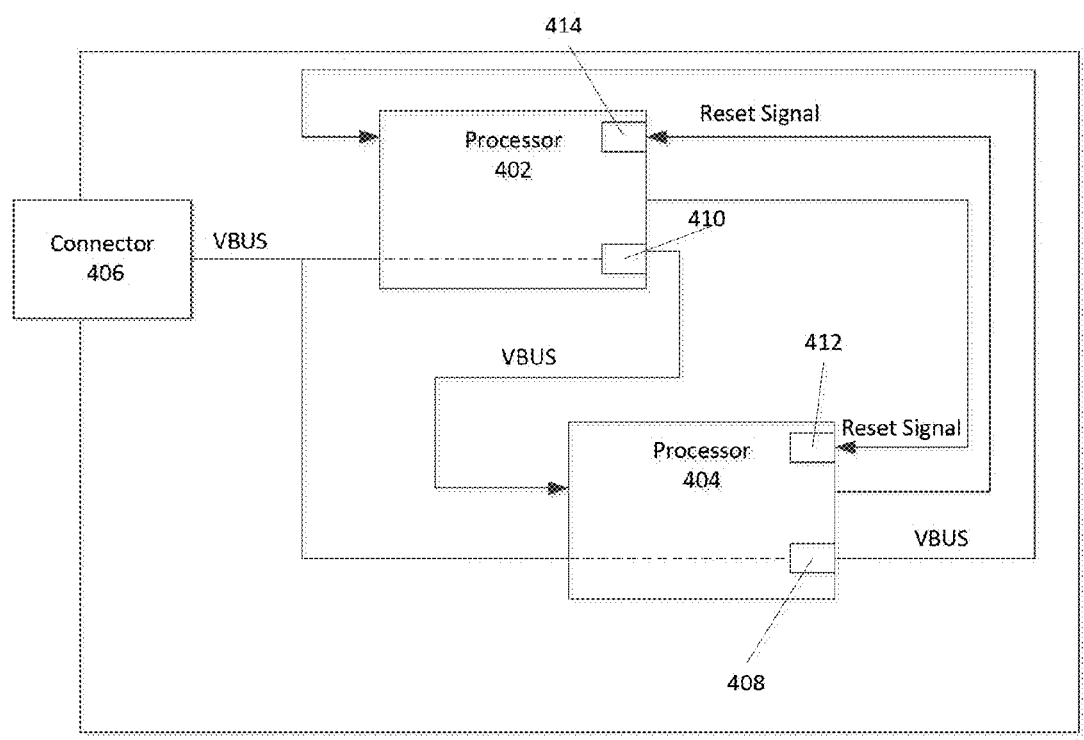
FIG. 4 illustrates a graphical user interface that may be used to adjust activity factors in accordance with an embodiment of the invention.

FIG. 4 illustrates a multiple processor configuration in which each processor monitors a state of another processor in accordance with an embodiment of the invention. Processors 402 and 404 are each connected to a connector 406. The configuration shown in FIG. 4 is similar to the configuration shown in FIG. 3. Processors 404 and 402 each transmit received signals to output ports 408 and 410 respectively. Output ports 408 and 410 are each connected to an input of the other processor. With the configuration shown in FIG. 4, each of processors 402 and 404 can determine if an error exists with the other processor and provides an appropriate signal to reset pins 412 and 414. Other embodiments may include three or more processors connected so that each processor is configured to monitor and reset at least one other processor.

Figure 5:
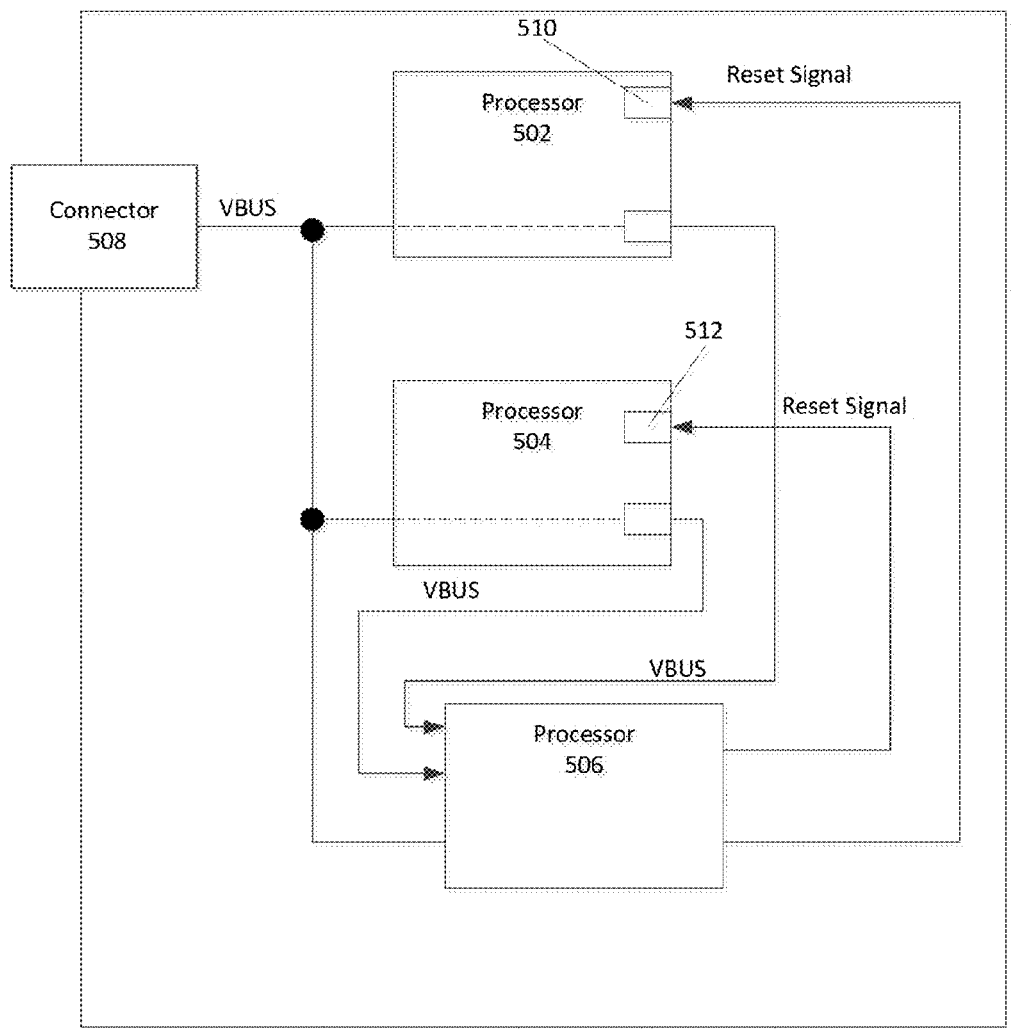
FIG. 5 illustrates a multiple processor configuration in which one processor monitors the states of multiple other processors in accordance with an embodiment of the invention.

FIG. 5 illustrates a multiple processor configuration in which one processor monitors the states of multiple other processors in accordance with an embodiment of the invention. Processors 502, 504 and 506 are each connected to a connector 508. Processor 506 may receive signals from processors 510 and 512 in a manner similar to that described in connection with FIG. 3. Processor 506 may reset processors 502 and 504 by sending appropriate signals to reset pins 510 and 512 respectively. In other embodiments a single processor may monitor and reset three or more other processors. Some embodiments may include a group of processor configured to monitor and reset another group of processors.

Figure 6:
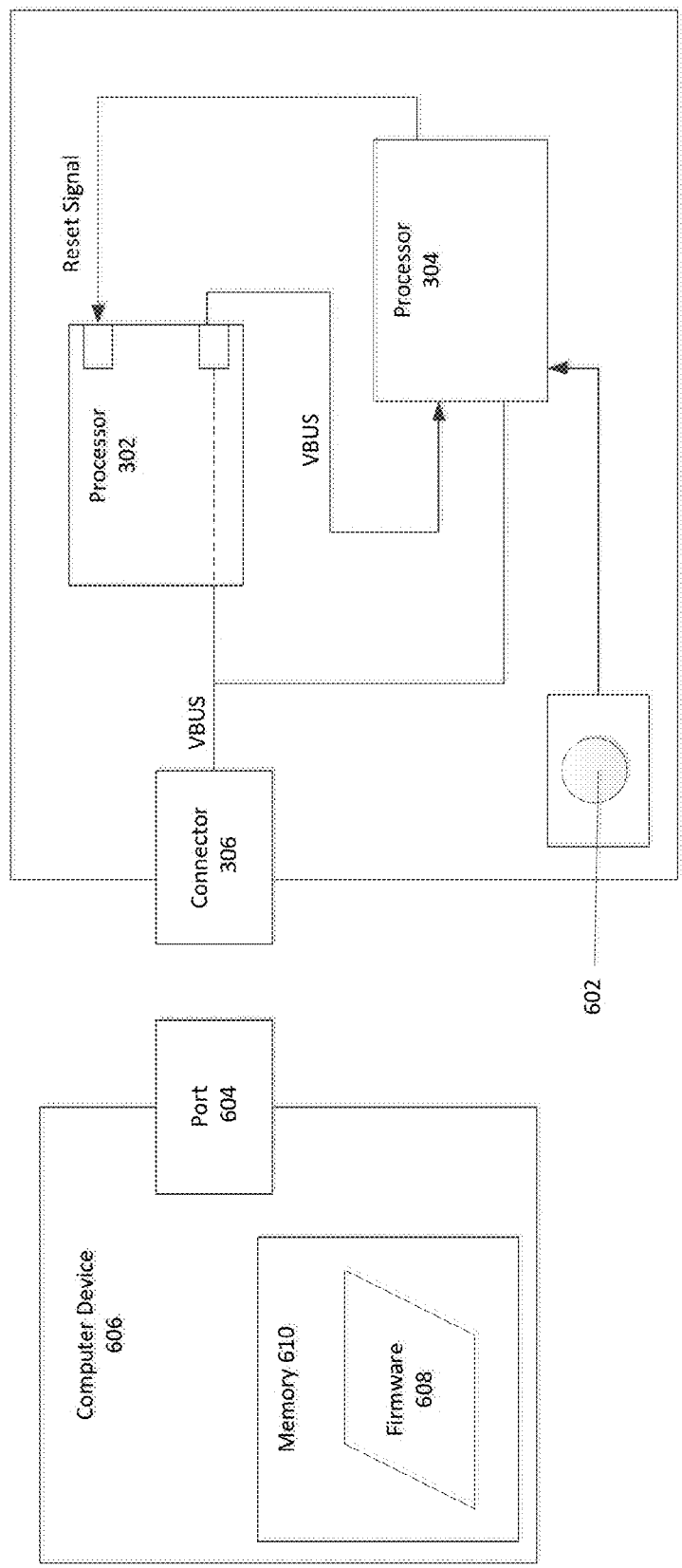
FIG. 6 illustrates a processor configuration that facilitates one processor resetting another processor in accordance with an embodiment of the invention.

FIG. 6 illustrates a processor configuration that facilitates one processor resetting another processor in accordance with an embodiment of the invention. Processors 302 and 304 are each connected to a connector 306. Processor 304 is configured to monitor the state of processor 302 and reset processor 302. An input button, such as button 602 may be used to control the type of reset operation that takes place. For example, pressing button 602 while connector 306 is inserted into a port 604 of a computer device 606 may result in a hard reset of processor 302 instead of a soft reset that would otherwise take place. Pressing button 602 while connector 306 is inserted into port 604 may result in other reset operations. For example, button 602 may be used to initiate the resetting of both processors 302 and 304. In one embodiment, button 602 may be used to initiate reloading of firmware, such as firmware 608 stored in memory 610, into one or both of processors 302 and 304.

Figure 7:
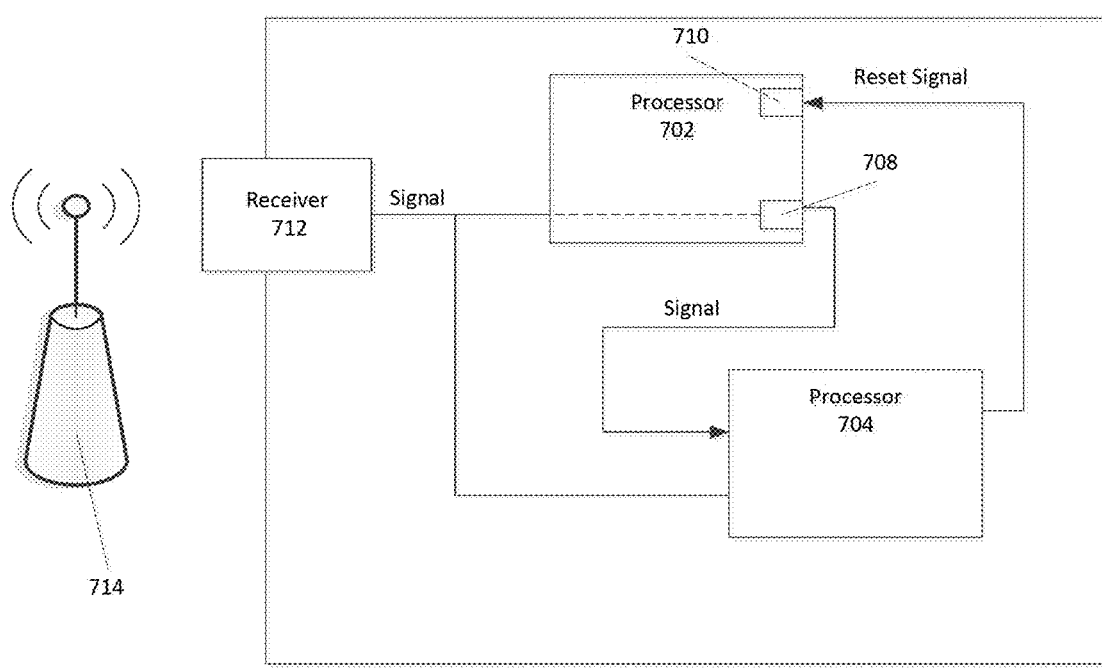
FIG. 7 illustrates a wireless device that includes a processor configuration that facilitates one processor resetting another processor while a device receives wireless data in accordance with an embodiment of the invention.

FIG. 7 illustrates a wireless device that includes a processor configuration that facilitates one processor resetting another processor while a device receives wireless data in accordance with an embodiment of the invention. Processor 702, processor 704, output port 708 and reset pin 710 may function similar to the corresponding components shown in FIG. 3. The embodiment shown in FIG. 7 includes a wireless receiver 712. Wireless receiver 712 receives wireless signals from one or more wireless signal sources, such as source 714. The wireless signals may be in any one of a variety of proprietary and nonproprietary formats including Wi-Fi, Bluetooth, near-field communication, RFID, Bluetooth Low Energy, Zigbee, or other wireless communication formats.

Figure 8:
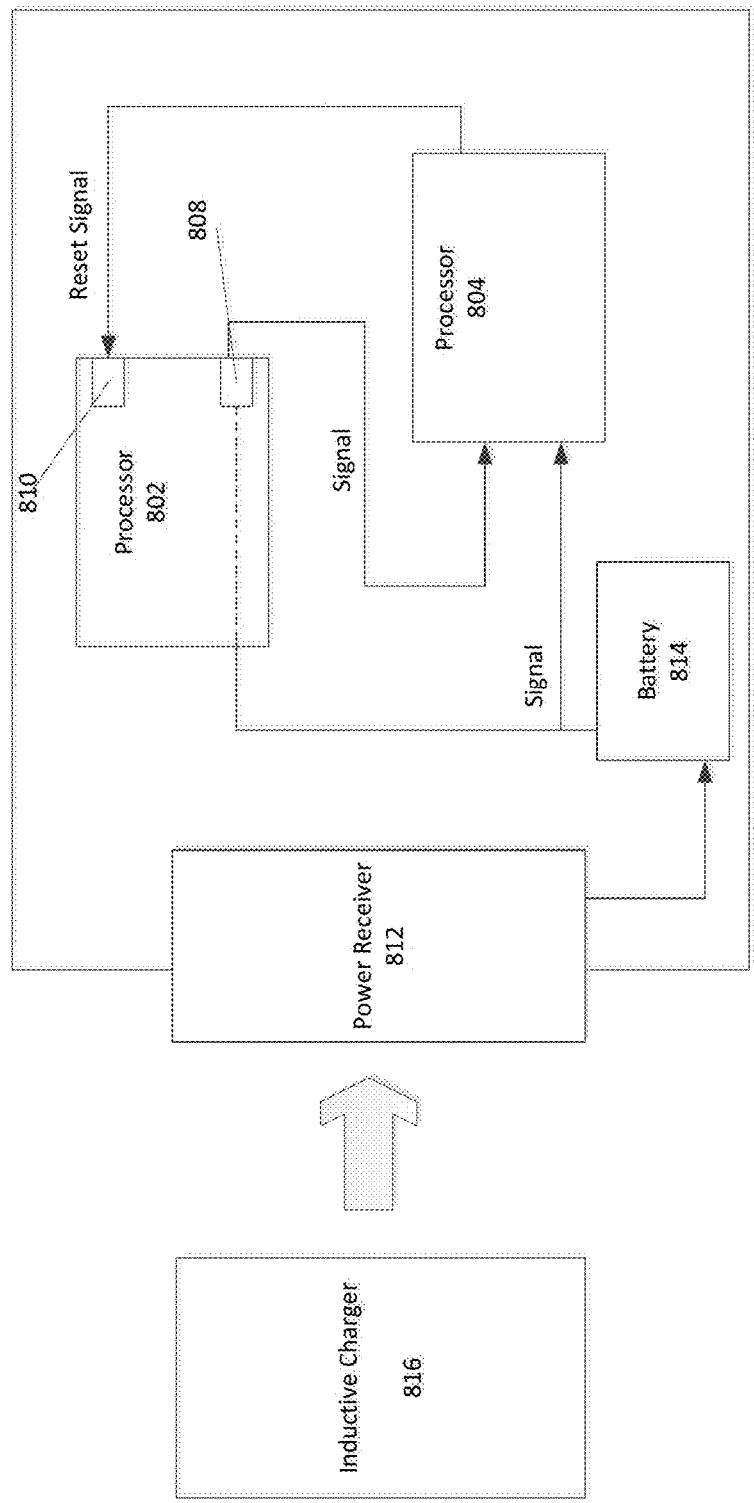
FIG. 8 illustrates a wireless device that includes a processor configuration that facilitates one processor resetting another processor while a device wirelessly recharges in accordance with an embodiment of the invention.

FIG. 8 illustrates a wireless device that includes a processor configuration that facilitates one processor resetting another processor while a device wirelessly recharges in accordance with an embodiment of the invention. Processor 802, processor 804, output port 808 and reset pin 810 may function similar to the corresponding components shown in FIG. 3. The embodiment shown in FIG. 8 includes a wireless power receiver 812. Wireless power receiver 812 may be implemented with a coil or other component that captures electromagnetic energy and passes the energy to one or batteries, such as battery 814. Wireless power receiver 812 receives electromagnetic energy from a source such as an inductive charger 816. In operation, when battery 814 receives energy from power receiver 812, battery 814 may send a signal to processors 802 and 804 to initiate processor 804 monitoring and resetting processor 802. Battery 814 may include a processor or control logic to control charging and/or sending power and signals to processors 802 and 804. In an alternative embodiment, inductive charger 816 provides modulated power signals to power receiver 812. The modulated signals may be used in a manner similar to the embodiment shown in FIG. 7.

Embodiments of the invention may include combinations of the features shown in FIG. 3-FIG. 8. For example, some embodiments may include multiple processors monitoring and resetting each other, receiving wireless signals, utilizing inductive charging and utilizing a button or other input device to determine a type of reset.

Figure 9:
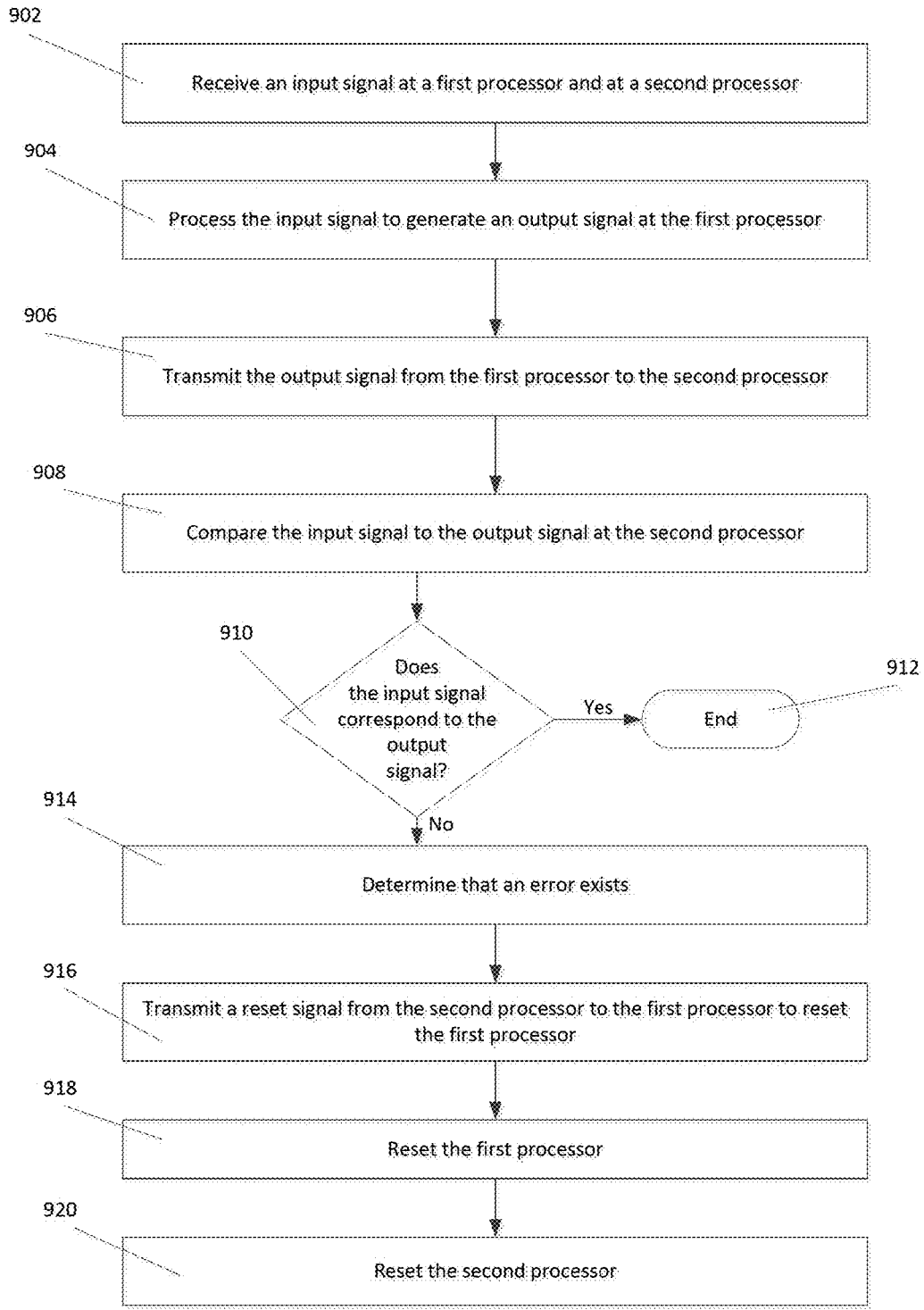
FIG. 9 illustrates a method of monitoring and resetting a processor in accordance with an embodiment of the invention.

FIG. 9 illustrates a method of monitoring and resetting a processor in accordance with an embodiment of the invention. First, in step 902 a first processor and a second processor receive an input signal. The input signal may be a power signal from a USB connector, a signal from a battery, a signal received from a wireless receiver or some other signal. Next, the input signal is processed at the first processor to generate an output signal in step 904. Step 904 may include passing the received signal to an output port. In step 906 the output signal is transmitted from the first processor to the second processor and the input signal is compared to the output signal at the second processor in step 908.

In step 910 it is determined whether the input signal corresponds to the output signal. Step 910 may include determining whether the two signals have the same voltage level. For example, the two signals may not correspond when one signal has a voltage level of five volts and another signal has a voltage level of zero volts. Step 910 may alternatively or additionally include analyzing timing information or characteristics of multiple signals. When the signals do correspond, there is no error and the process ends in step 912.

When the signals do not correspond, it is determined that an error exits in step 914. When an error exists, in step 916 a reset signal is transmitted from the second processor to the first processor to reset the first processor. Step 916 may include applying a signal with a predetermined voltage level to a set pin of the first processor. The first processor is reset in step 918. The second processor may also be reset in step 920.

As mentioned above, alternative embodiments may include receiving and comparing multiple signals to determine if errors exist and one or more processors needs to be reset. The multiple signals may be received from a USB connector or any other connector that electrically connects an electronic device to another device.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

What is claimed is:

1. A device comprising:
   a first processor and a second processor each configured to receive an input signal;
   wherein the first processor is configured to process the input signal to generate an output signal and transmit the output signal to the second processor;
   wherein the second processor is configured to
   (i) compare the input signal to the output signal to determine whether the input signal corresponds to the output signal, and
   (ii) transmit a reset signal to the first processor in response to determining that the input signal does not correspond to the output signal; and
   wherein the first processor is further configured to load firmware in response to receiving the reset signal.

2. The device of claim 1, wherein the input signal comprises a power signal.

3. The device of claim 2, wherein the power signal comprises a USB VBUS signal.

4. The device of claim 1, further comprising a wireless receiver configured to transmit the input signal to the first processor and the second processor.

5. The device of claim 1, wherein the input signal has a first voltage level and the output signal has a second voltage level.

6. The device of claim 5, wherein the second processor is configured to compare the input signal to the output signal by comparing the first voltage level to the second voltage level.

7. The device of claim 1, wherein the second processor is configured to compare the input signal to the output signal by comparing first timing information of the input signal to second timing information of the output signal.

8. The device of claim 1, wherein the second processor is configured to reset after transmitting the reset signal to the first processor.

9. The device of claim 1, wherein the device is configured to be worn by a user and further comprising:
   at least one sensor configured to measure movements of the user while the device is worn by the user; and
   a memory configured to store movement data generated by the at least one sensor and corresponding to the movements of the user.

10. The device of claim 9, wherein the device is configured to be incorporated into an article of apparel worn by the user.

11. The device of claim 10, wherein the article of apparel comprises one of a watch, an armband, a wristband, a necklace, a shirt, or a shoe.

12. The device of claim 9, wherein the device is configured to by worn around a wrist of the user.

13. The device of claim 9, wherein the at least one sensor comprises an accelerometer.

14. The device of claim 13, wherein the accelerometer comprises a multi-axis accelerometer.

15. The device of claim 9, wherein the device is configured to form at least one parameter based on the movement data generated by the at least one sensor.

16. The device of claim 15, wherein the at least one parameter comprises one or more of a speed of the user, a distance traveled by the user, a number of steps taken by the user, an energy expenditure of the user, activity points earned, or currency earned.

17. The device of claim 1, further comprising:
   a battery; and
   a wireless power receiver configured to charge the battery in response to wireless electromagnetic energy received.

18. The device of claim of claim 17, wherein the battery is configured to initiate a reset process for the first processor and the second processor in response to receiving energy from the wireless power receiver.

19. The device of claim 1, further comprising:
   a button configured to initiate a reset process for the first processor and the second processor when pressed.

20. A device comprising:
a first processor and a second processor each configured to receive an input signal;
wherein the second processor is configured to transmit, to the first processor, a reset signal in response to determining that the input signal does not correspond to an output signal generated by and received from the first processor which is configured to process the input signal to generate the output signal; and
wherein the first processor is further configured to load firmware in response to receipt of the reset signal.

* * * * *